Dec. 8, 1936.  H. J. HUBER  2,063,875
ELECTRICAL SWITCH GEAR
Filed Oct. 20, 1934  2 Sheets-Sheet 1
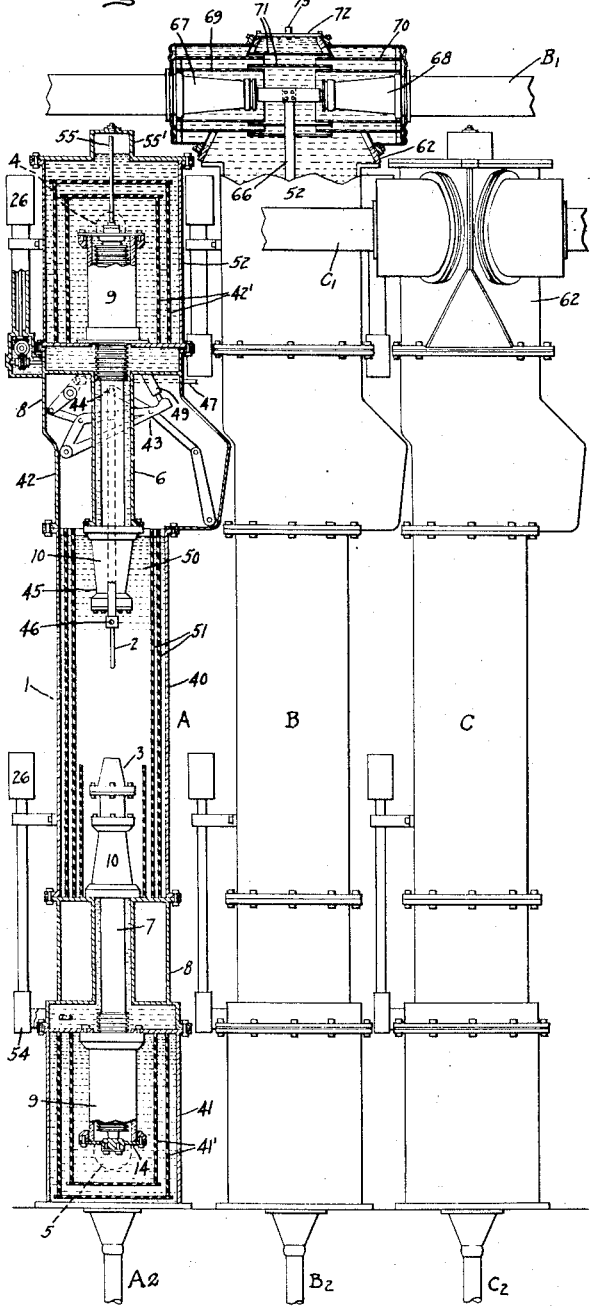
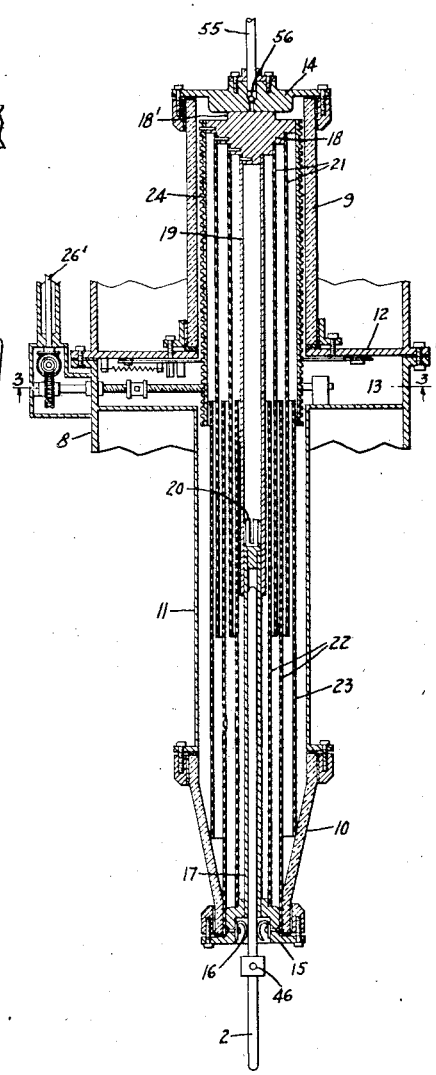
Inventor:
Herman J. Huber,
by Harry E. Dunham
His Attorney.

Dec. 8, 1936.  H. J. HUBER  2,063,875
ELECTRICAL SWITCH GEAR
Filed Oct. 20, 1934   2 Sheets-Sheet 2
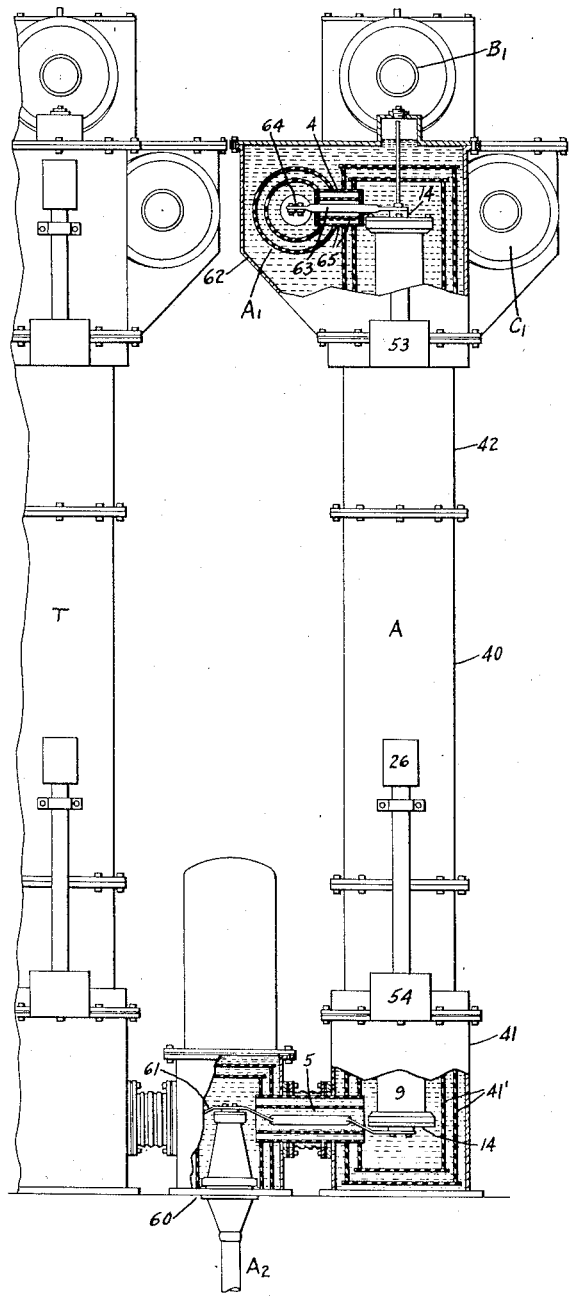
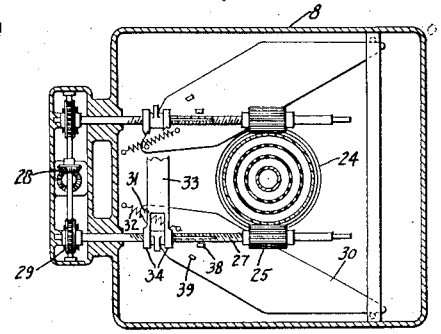
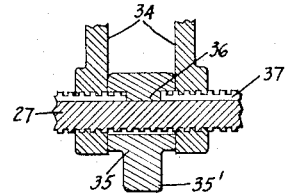
Inventor:
Herman J. Huber,
by Harry E. Dunham
His Attorney.

Patented Dec. 8, 1936

2,063,875

UNITED STATES PATENT OFFICE 2,063,875

ELECTRICAL SWITCH GEAR

Herman J. Huber, Brookline, Pa., assignor to General Electric Company, a corporation of New York Application October 20, 1934, Serial No. 749,203

7 Claims. (Cl. 175—298)

My invention relates to electrical switchgear, more particularly to switchgear of the metal-clad type for polyphase high tension power circuits, and has for its principal object the provision of improved switchgear of the aforesaid type which shall be electrically efficient and compact and economical in design.

My invention will be more fully set forth in the following description referring to the accompanying drawings, and the features of novelty which characterize my invention will be pointed out with particularity in the claims annexed to and forming a part of this specification.

Referring to the drawings, Fig. 1 is an elevational view, partly in section, of polyphase switchgear embodying my invention; Fig. 2 is an enlarged sectional view of a part of the apparatus shown in Fig. 1; Fig. 3 is a sectional plan view taken along the line 3—3 of Fig. 2; Fig. 4 is a detailed view, in section, of a part of the structure shown in Fig. 3, and Fig. 5 is an elevational end view, partly in section, of the polyphase switchgear arrangement shown in Fig. 1.

In polyphase metal clad gear for high tension power circuits, the phase circuit breaker, disconnecting devices, busbars, etc. are commonly incorporated in individual units, these phase units being generally similar and grouped for polyphase operation. A detailed description of but one unit will therefore be sufficient.

The switchgear illustrated by Fig. 1 shows in section a single phase unit of a polyphase metal clad bus and switch station comprising a circuit breaker of suitable design and interrupting capacity, as a single-break oil circuit breaker I of the well known oil blast type. The relatively movable contact structure of the circuit breaker includes a vertically movable rod contact 2 which is connected to one terminal of the breaker and coacting stationary contact structure 3 which is connected to the other terminal of the breaker.

The circuit controlled by the breaker includes a power supply conductor, as a busbar connected at 4 to the upper part of the unit, and a branch conductor, as a feeder connected at 5 to the lower part of said unit. The terminals of the circuit breaker I, when the circuit breaker is in the open circuit position shown, may be disconnected and electrically isolated with respect to the busbar and feeder by disconnecting and isolating means incorporated in the upper and lower lead-in conductor bushings 6 and 7, respectively.

For reasons well known in the art, both terminals of a circuit breaker are preferably disconnected and electrically isolated with respect to the associated circuits when the circuit breaker is to be inspected or repaired. A preferred practice is to disconnect each terminal of the breaker with respect to its associated circuit by a disconnect switch, ground the disconnect switch member which is connected to the breaker terminal, and interpose a grounded shutter or the like between the disconnect switch contact members so that said members are electrically isolated with respect to each other.

In previous designs the above described arrangement generally resulted in comparatively large and expensive structures in order to provide adequate insulation for the higher voltages. For example, the high voltage bushings alone in such designs occupied considerable space and contributed considerably to the cost of the gear.

Referring more particularly to Figs. 1 and 2, the upper lead-in conductor bushing 6, for example, comprises an intermediate metallic casing 8 which is grounded and which carries at the opposite ends thereof insulating sleeves 9 and 10. The casing 8, which is incorporated in the switchgear unit in a manner hereinafter described, comprises a cylindrical portion 11 to which the insulator 10 is secured and supports a plate 12 on which the insulator 9 is centrally mounted. The casing 8 forms a compartment 13 within which the isolating and grounding means are disposed.

The stationary terminals of the disconnecting device (Fig. 2) comprise a contact cap 14 suitably mounted on the insulator 9 and connected, as illustrated in Fig. 5, to the busbar at 4 and a terminal contact 15 suitably mounted on the lower insulator 10 and in sliding electrical contact, as at 16, with the circuit breaker contact 2. The terminal contact 15 has likewise secured and electrically connected thereto a fixed conducting sleeve 17 which extends axially of the insulator 10 and sleeve 11. The breaker contact 2 is guided for reciprocal movement within said sleeve and is electrically connected thereto as illustrated.

The movable element of the disconnecting device comprises a contact member 18 adapted to make butt contact at 18' with the terminal cap 14. A conducting sleeve 19 is secured and electrically connected to the contact 18 and extends axially of the insulator 9 and casing cylinder 11 so as to have telescopic engagement with the lower stationary sleeve 17. Good contact engagement is obtained between the conducting sleeves 17 and 19 as by a contact 20 carried by the sleeve 17 and slotted for the purpose of providing a resilient contact.

It will be apparent from the above description that operation of the rod contact 2 does not break the electrical connection between the movable contact 18 of the disconnecting switch and the breaker terminal and that the upper breaker terminal is disconnected from the busbar 4 by lowering of the disconnect contact 18.

For the purpose of insulating the bushing and disconnecting device with respect to high voltages, the movable contact 18 has depending therefrom spaced, concentrically arranged insulating sleeves 21 and the lower terminal structure at 15 supports similarly arranged insulating sleeves 22. The insulating sleeves 21 and 22 overlap at their free ends and extend in telescopic relation to each other as illustrated. An outer fixed insulating sleeve 23 extending throughout the casing cylinder 11 is likewise employed. Accordingly, in the closed circuit position the current conductors extending centrally of the bushing are insulated for high potentials throughout the length of the bushing.

The operating means for the movable contact 18 of the disconnecting device comprises in the present instance a motor actuated gear and rack. Referring particularly to Figs. 2 and 3, the contact 18 has secured thereto a rack 24 which is cylindrical in form and extends through the insulator 9 and plate 12 into the casing 8. As best illustrated by Fig. 3, the rack 24 is driven by a pair of gears 25 which are connected to a motor 26 through drive shaft 26', parallel gear shafts 27 and gearing 28 and 29. Accordingly, rotation of the motor drive shaft 26' causes lowering or elevation of the disconnect contact 18.

In addition to actuating the contact 18 the motor operates the metallic isolating shutters 30 disposed in the compartment 13. Each shutter 30 comprises a plate-like member pivotally mounted at 31 on the grounded casing 8 and shaped so as to completely close the lower end of the insulator 9 when the disconnect contact 18 is lowered below that point and the shutters are brought together. Each shutter is likewise provided with an overcenter spring 32 tending to actuate the shutters by snap action and to hold the shutters in either completely open or closed position.

The shutter actuating means also comprises a bar 33 which is forked at its opposite ends at 34. The forked portions 34 are in screw-threaded engagement, as illustrated by Fig. 4, with the shafts 27 so that the bar 33 moves transversely during rotation of said shafts. Mounted between the forked members 34 are rotatable members as traveling sleeves 35 freely movable for longitudinal movement on the shafts 27 but keyed, as at 36, in a longitudinal slot 37 with respect to relative rotation. Each sleeve 35 is provided with an offset lug 35' for coacting with the corresponding shutter.

The thread arrangement on the shafts 27 is such that the lugs 35' rotate away from each other, as viewed in Fig. 3, when the disconnecting device is being opened, and towards each other when the contact 18 is being elevated to closed position. Accordingly, the shutters 30 are provided with lugs 38 arranged to be engaged by the rotating lugs 35' when the contact 18 is beneath the shutters for causing initial rotation of said shutters past the over-center spring positions, the springs 32 completing the shutter closing operation. Similar shutter lugs 39 are positioned so as to be engaged by the rotating lugs 35' for opening the shutters prior to elevation of the contact 18. As above pointed out, the shutters 30 are suitably grounded to the casing 8 so that when disconnect contact 18 is beneath the closed shutters the contacts 14 and 18 are electrically isolated. In this position the contact 18 may likewise be independently grounded, if desired, to the casing 8.

The phase switchgear units are vertically arranged as illustrated by Fig. 1, the cylindrical circuit breaker casing 40 of each unit being vertically positioned and mounted at its lower end on one of the grounded casings 8. The base structure comprises a cylindrical casing 41 forming a terminal and junction chamber for the lower bushing and disconnecting device 7 and feeder. At the upper part of the circuit breaker casing 40 is mounted a mechanism casing 42 forming in the present instance part of casing 8. The casing 42 houses linkage structure 43 connected, as at 44, to a pair of members 45 offset with respect to the lead-in bushing 6, and connected at 46 to opposite sides of the rod contact.

The breaker actuating means (not shown) is connected to an actuating rod 47, reciprocal movement of which causes opening and closing movement of the rod contact 2 through the linkage 43. Suitable buffer structure 49 cooperates with the linkage 43 for absorbing the opening shock. Closing of the breaker is effected by lowering of the rod contact 2 into engagement with the stationary contact structure 3. The contact structure 3 may be of any suitable type, as for example of the oil-blast type, wherein a baffle arrangement causes an oil blast through the arc upon separation of the contacts. The breaker casing is filled with a suitable insulating and arc extinguishing liquid 50, as oil, to the level indicated and is provided with a plurality of concentrically arranged cylindrical insulating liners 51.

Above the upper casing 8 is mounted a terminal and junction casing 52 similar to 41 from which the busbar at 4 is led. The casings 41 and 52 are each oil filled, as illustrated, and are provided with cylindrical insulating liners 41' and 42'. The disconnecting devices at 6 and 7 are likewise oil filled so that the disconnect contacts are likewise insulated by oil in the open circuit position.

The casing 52 likewise supports the motor 26 and mechanism casing 53 for actuating the above described disconnecting device and shutter, a similar motor 26 being suitably connected to mechanism at 54 for simultaneously operating the lower disconnecting device at 7 which is generally similar to the upper disconnecting device described except for the fact that it is in inverted position.

For the purpose of venting gas formed in the disconnecting device a tube 55 of insulating material (Figs. 1 and 2) is connected to the terminal cap 14 and extends into the expansion chamber 55' formed at the upper part of the casing 52. A ball valve 56 serves to close the vent passage when no gas pressure is present.

It will be observed that the above-described arrangement provides a straight and direct conducting path for the circuit through the complete switchgear unit. This path is not only adequately insulated by comparatively simple insulating structure but is appreciably shortened and simplified by incorporating the disconnecting and isolating device in the upper and lower lead-in conductor bushings. This arrangement for a switchgear unit is disclosed and broadly claimed in an application for Electrical switchgear, Serial No. 749,206, filed concurrently herewith by D. C. Prince.

In operating the switchgear to open and close the circuit and perform the disconnecting and isolating operations, the circuit breaker mechanism is suitably interlocked with respect to the energizing circuits of the motors 26 so that opening of the disconnecting devices is preceded by opening of the circuit breaker and closing of the circuit breaker is preceded by closing of the disconnecting devices according to well known and established practice in the art. Accordingly, upon opening of the circuit breaker 1 the disconnecting devices at 6 and 7 are subsequently operated, as previously described, to disconnect and isolate the breaker terminals with respect to the busbar and feeder. With the apparatus in the open circuit, disconnected and isolated position the circuit breaker 1 may be entered for inspection or repair without danger.

Figs. 1 and 5 illustrate three separate phase units as above described grouped for polyphase operation. The units designated A, B, and C are arranged side-by-side in a row extending parallel to the associated phase busbars $A_1$, $B_1$, and $C_1$, respectively. The feeders $A_2$, $B_2$, and $C_2$, as illustrated by Fig. 5, extend transversely of the busbars at 5 and may terminate directly in a cable vault at 60 and be connected at 61 to conductors of similar transfer units T when an auxiliary or transfer bus is used. The usual current transformer and potential devices may be mounted, if desired, in the cable vault.

Referring more particularly to Fig. 5, the busbars $A_1$, $B_1$, and $C_1$ are mounted in parallel arrangement adjacent the switchgear busbar junction chambers, a busbar extending along each side of said chambers and the third busbar mounted directly overhead. This arrangement results in an efficient and compact design.

The busbars at the opposite sides of each unit extend through extensions of the corresponding chambers, these extensions being formed by sheet metal casings 62 which may be wedge-shaped, as illustrated by Fig. 1, for facilitating assembly and disassembly and conserving space and material. The wedge-shape casings make it possible to remove any section of bus without taking any other part of the structure apart. It will be noted that the ends of bushing 68 will clear the small or outer end of the corresponding wedge-shape box. So, in like manner, the bus enclosure $B_1$, cover 62 with its bus, insulation, etc. can be removed and replaced easily.

The busbar connections (Fig. 5) for the laterally disposed busbars each comprise a flexible conductor 63 suitably connected to the disconnect terminal 14 and to the busbar $A_1$ at 64. The conductor 63 is suitably insulated with respect to the metal enclosing housing as by insulating sleeves 65. The busbar itself is suitably metal enclosed as by a sheath or pipe and is suitably insulated with respect thereto.

The overhead busbar $B_1$ (Fig. 1) is connected directly to the associated disconnect terminal as by a suitable conductor 66 extending vertically from the disconnect terminal. In the present instance the junction chamber extension 62 is mounted directly over the open end of the casing 52. As in previous cases, the busbar extends through the chamber extension 62 and is provided with suitable entrance insulating bushings 67 and 68. These bushings include concentrically arranged insulating sleeves 69 and 70 extending part way to the conductor junction. Insulating sleeves 71, slidable with respect to the sleeves 69 and 70, interconnect the free ends of said sleeves so as adequately to insulate the conductor junction. The sleeves 71 are slotted at the lower sides thereof with respect to conductor 66 so that they may be moved over the sleeves 69 and 70 for permitting access to the junction through the upper detachable cover structure 72. The cover structure is provided with suitable gas vents 73 of the character previously described.

A metal clad bus and switch station constructed in accordance with my invention is therefore not only simple and compact in design but is arranged efficiently from the viewpoint of operation and inspection. The busbars, which should require very little attention, are mounted overhead leaving the space around the breakers and disconnecting devices comparatively clear. It will, of course, be apparent that suitable inspection covers may be provided for the circuit breaker and other casings housing apparatus which is periodically inspected. Where the casings are oil-filled, the oil is suitably drained from the unit or affected portion thereof prior to inspection.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. A phase unit for a high tension bus and switch station of the metal-clad type comprising a circuit breaker having a casing, the terminals of said circuit breaker being at the upper and lower ends of said casing respectively, means housing a disconnecting device at each end of said breaker casing and in vertical alinement therewith, means forming a terminal and junction chamber at the upper and lower extremities of said unit respectively, a busbar positioned at the upper part of said unit and electrically connected thereto through the adjacent junction chamber, and a feeder conductor connected to said unit through the lower junction chamber.

2. A phase unit for a high tension bus and switch station of the metal-clad type comprising a circuit breaker having a casing, the terminals of said circuit breaker being at the upper and lower ends of said casing respectively, a casing housing a disconnecting device at each terminal of said breaker, the casing forming a terminal and junction chamber at the upper and lower extremities of said unit respectively, the aforesaid casings being in vertical alinement, a busbar positioned and supported at the upper part of said unit and electrically connected thereto through the adjacent junction chamber, and a feed conductor connected to said unit through the lower junction chamber.

3. A polyphase switchgear arrangement for a high tension bus and switch station of the metal-clad type including three phase units each comprising an oil circuit breaker having a terminal and a disconnecting device at the upper and lower ends thereof respectively, means forming a busbar junction chamber adjacent the upper disconnecting device of said breaker, and means for positioning the corresponding phase busbar adjacent said busbar junction chamber, the aforesaid phase units being positioned in a row and the phase busbars extending along opposite sides of and above said units.

4. A polyphase switchgear arrangement for a high tension bus and switch station of the metal-clad type including three individual phase units each comprising a base section forming a feeder junction chamber, an oil circuit breaker having a terminal and a disconnecting device at the upper and lower ends thereof respectively, said circuit breaker and disconnecting devices being mounted above and in vertical alinement with said feeder junction chamber, means forming a busbar junction chamber above the upper disconnecting device of said breaker, and means for supporting the corresponding phase busbar adjacent said busbar junction chamber, the aforesaid phase units being positioned in a row and the phase busbars extending parallel with and at opposite sides of and above the busbar junction chambers of said units.

5. In electrical switchgear having relatively movable disconnect contacts, means for electrically isolating said contacts in the open circuit position thereof comprising shutter structure arranged to be interposed between said contacts and shutter, actuating means comprising a spring arranged for over-center operation either to open or close said shutter structure, and a rotatable member likewise movable longitudinally of its axis of rotation detachably related with respect to said shutter for moving said spring over center thereby initiating the opening and closing movements of said shutter.

6. In electrical switchgear including relatively movable disconnect contacts, means for electrically isolating said contacts in the open circuit position thereof comprising a shutter mounted for pivotal movement, a spring connected to said shutter for over-center operation with respect to the pivotal support of said shutter, a rotatable shaft and a member keyed to said shaft for rotation therewith, said member being movable longitudinally of said shaft, and means secured to said shutter adapted to be engaged by said member for moving said spring over center thereby initiating the opening and closing movements of said shutter.

7. In electrical switchgear including relatively movable disconnect contacts, means for electrically isolating said contacts in the open circuit position thereof comprising a pair of pivotally mounted shutters arranged to be interposed between said contacts, spring means arranged for over-center operation with respect to the pivotal mountings of said shutters for effecting opening and closing thereof, a pair of spaced parallel shafts, a member transversely interconnecting said shafts and in screw-threaded engagement therewith, a member keyed to each of said shafts and movable with said transverse member longitudinally of said shaft, and a pair of lugs secured to each of said shutters for coacting with the corresponding rotatable member for initiating the opening and closing movements of said shutter.

HERMAN J. HUBER.